Figure 16:
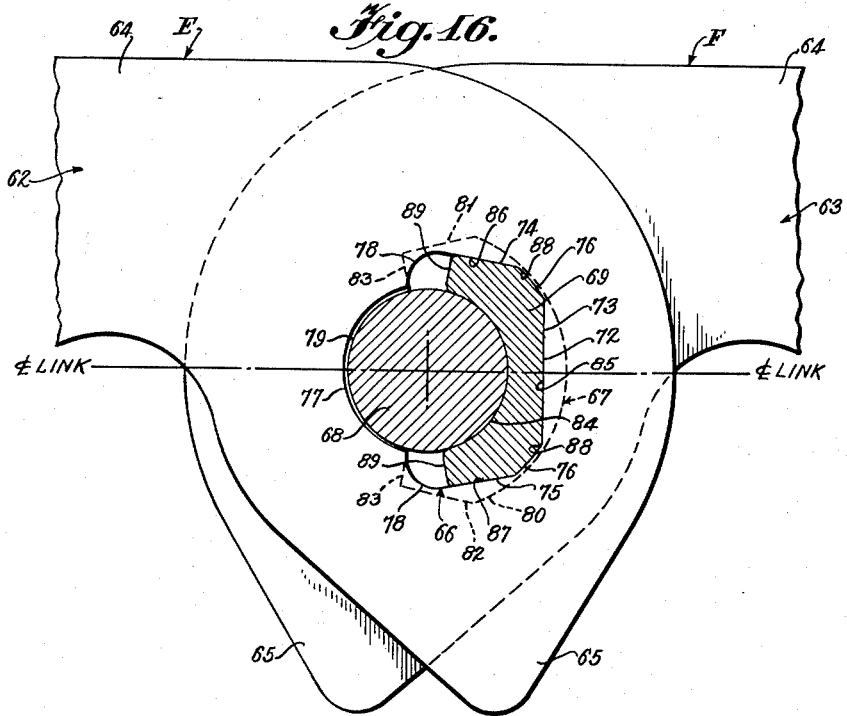

Feb. 23, 1954
H. S. PIERCE
2,669,879
POWER TRANSMISSION CHAIN
Filed July 6, 1951
10 Sheets-Sheet 1
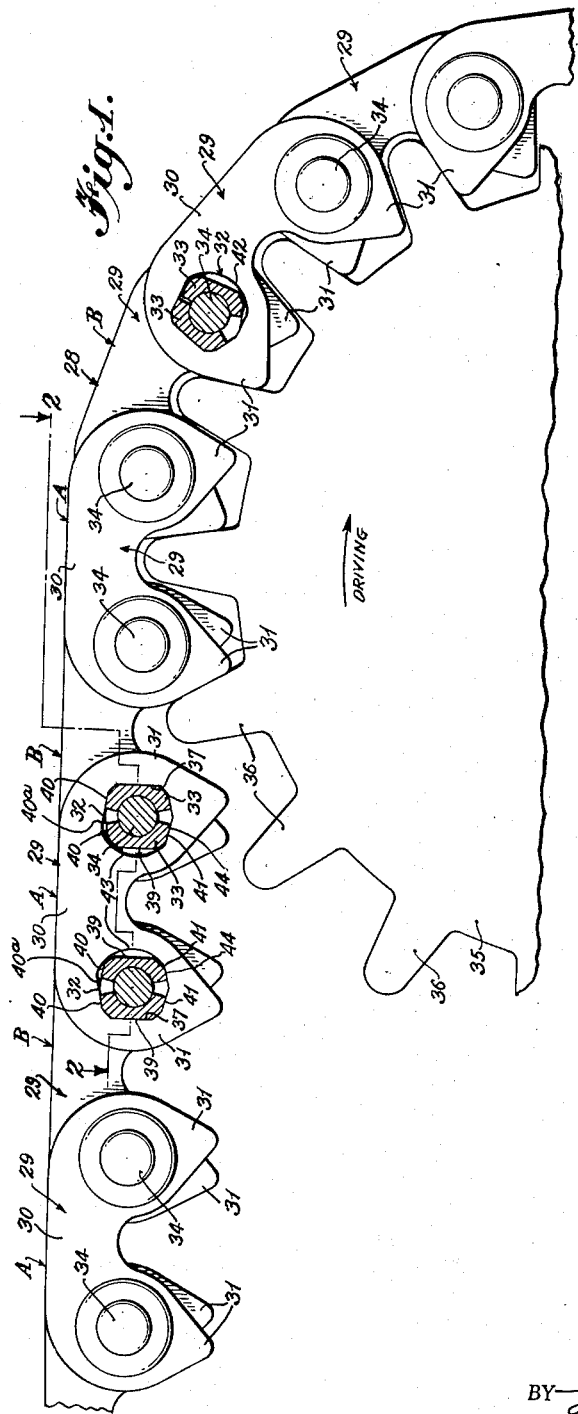
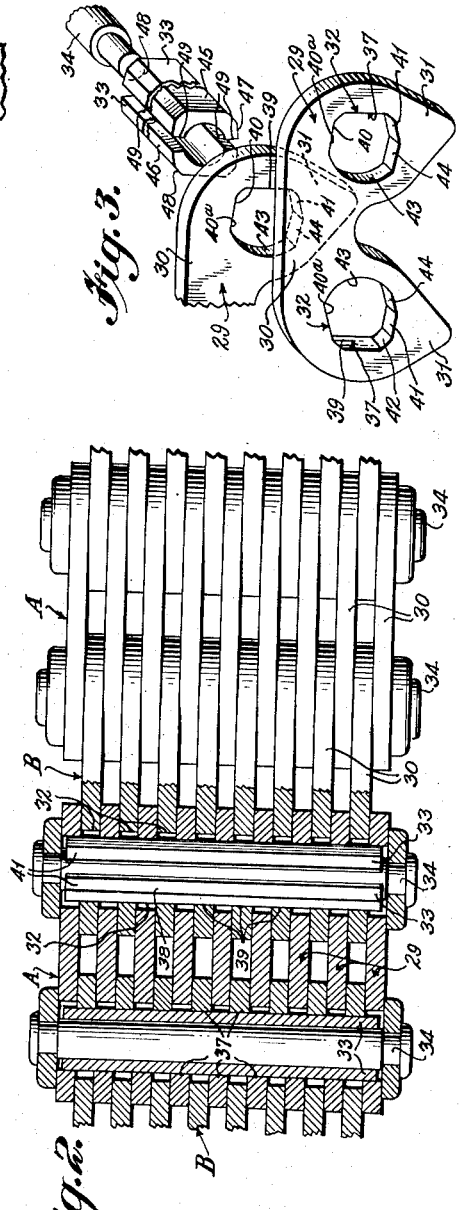
INVENTOR
*Harold S. Pierce*
BY
ATTORNEY Feb. 23, 1954
H. S. PIERCE
2,669,879
POWER TRANSMISSION CHAIN
Filed July 6, 1951
10 Sheets-Sheet 2
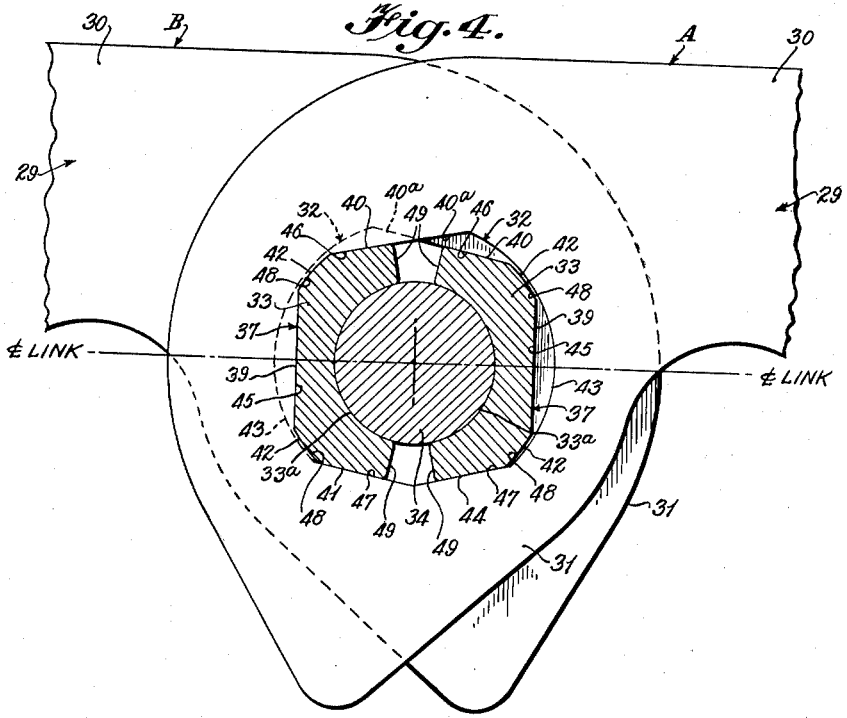
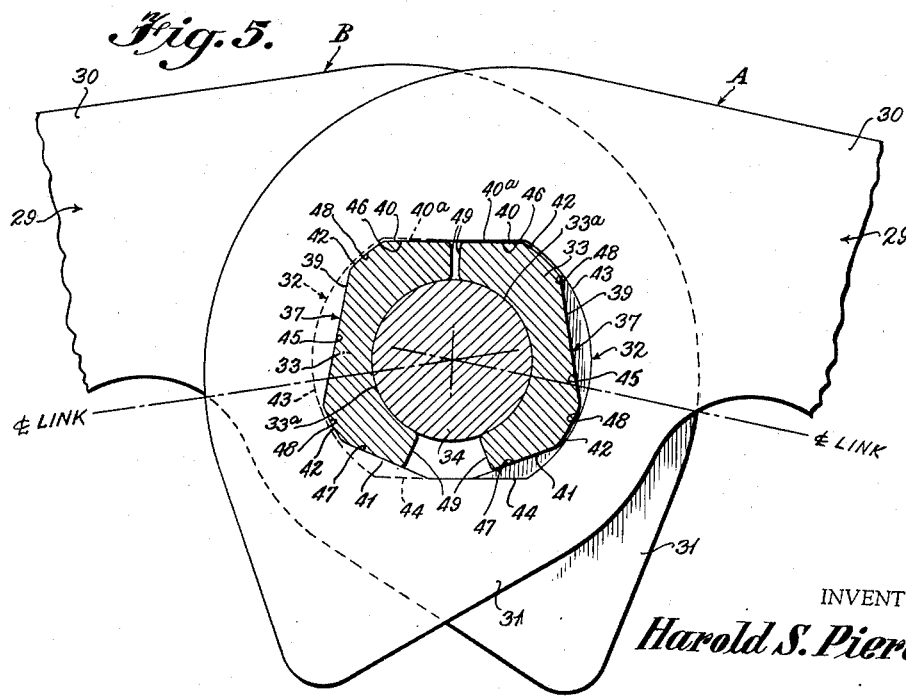
INVENTOR
*Harold S. Pierce*
BY
ATTORNEY Feb. 23, 1954   H. S. PIERCE   2,669,879
POWER TRANSMISSION CHAIN
Filed July 6, 1951   10 Sheets-Sheet 3
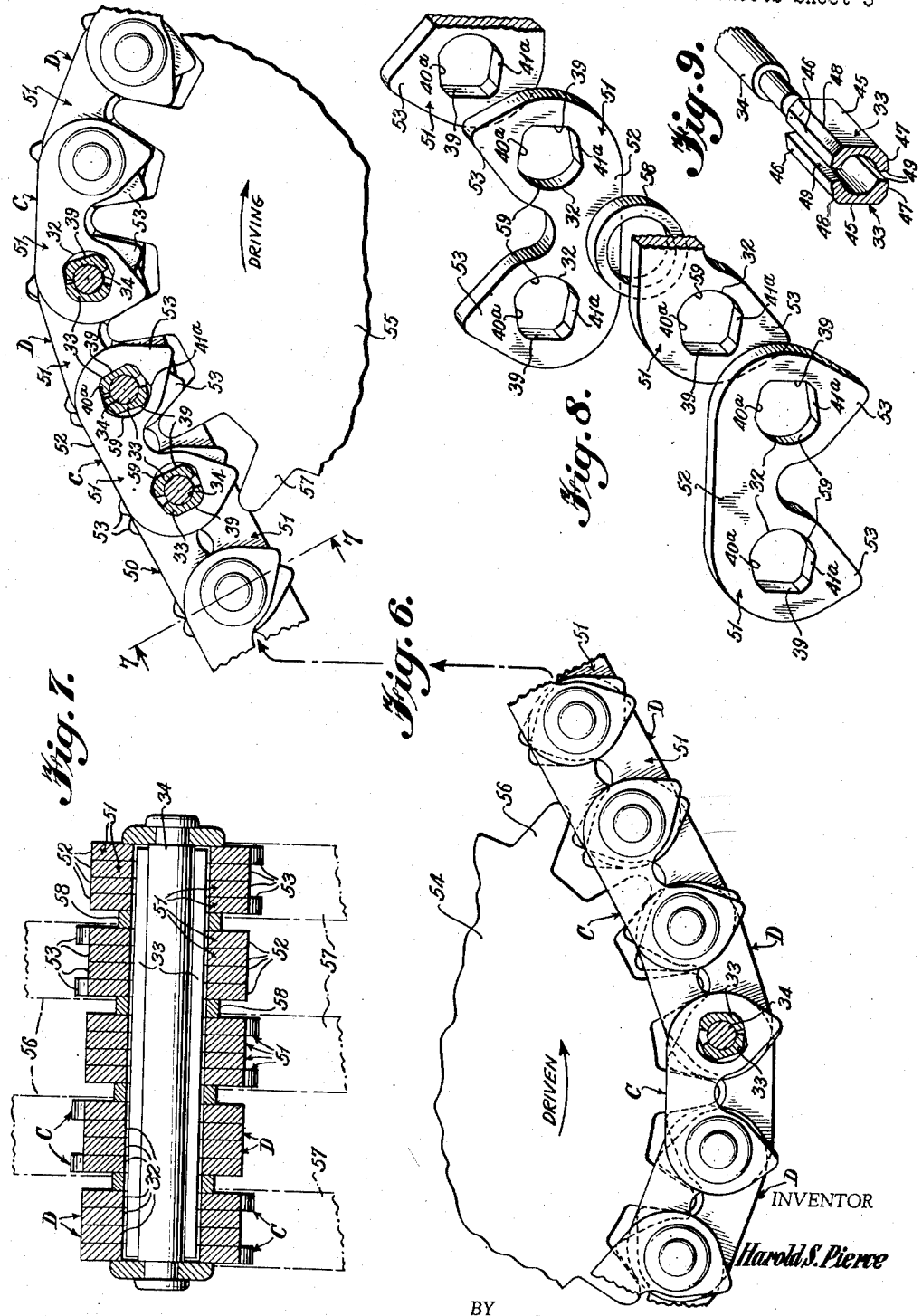
INVENTOR
Harold S. Pierce
BY
L. Donald Myers
ATTORNEY

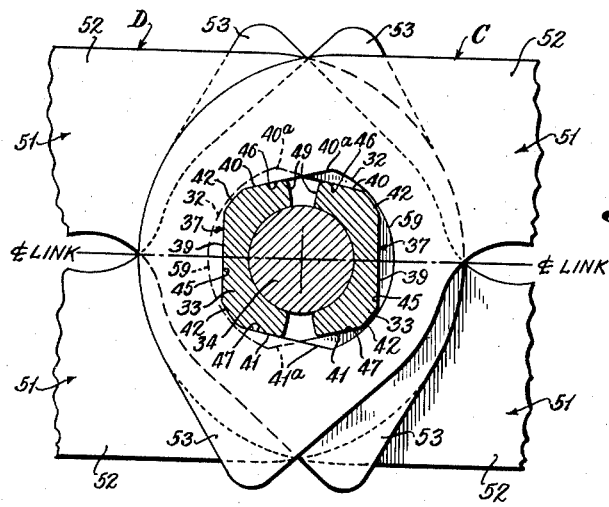
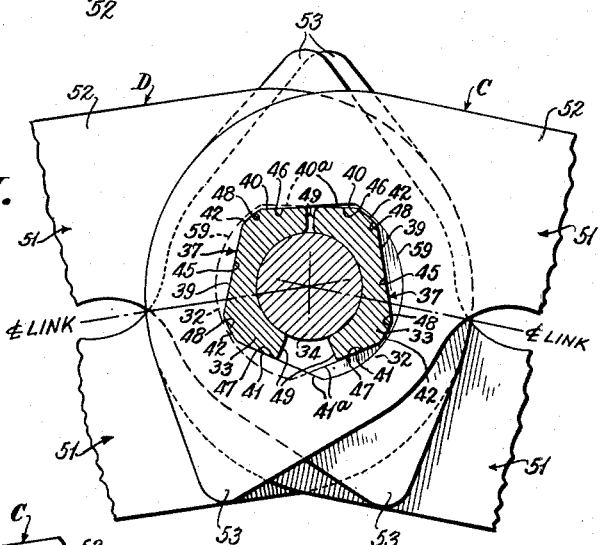
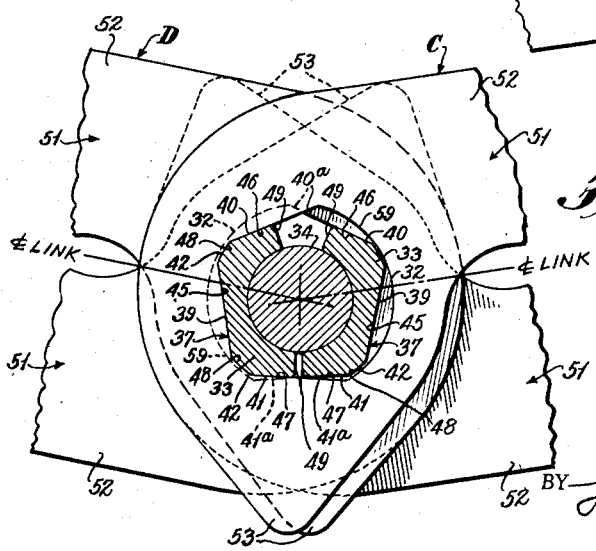

Feb. 23, 1954
H. S. PIERCE
2,669,879
POWER TRANSMISSION CHAIN
Filed July 6, 1951
10 Sheets-Sheet 5
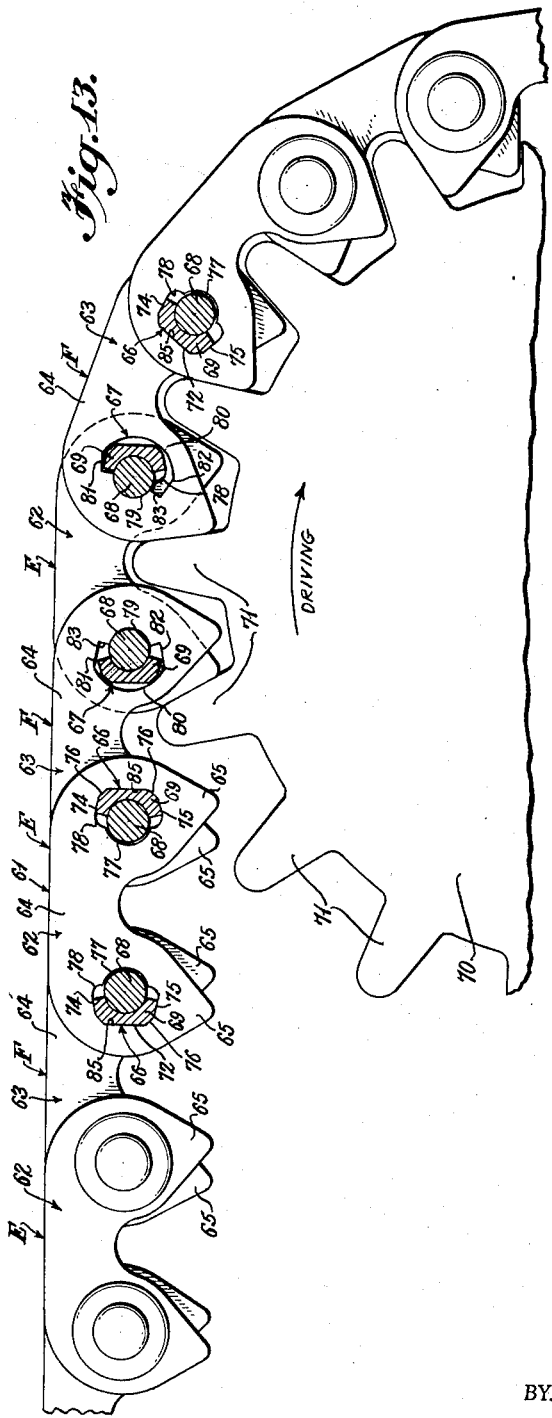
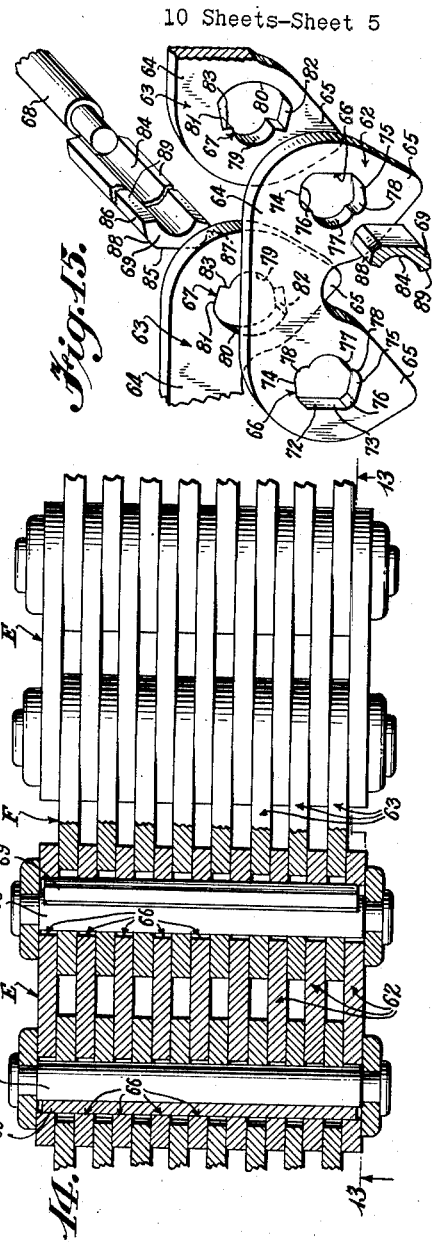
INVENTOR
*Harold S. Pierce*
BY
ATTORNEY INVENTOR
Harold S. Pierce Feb. 23, 1954   H. S. PIERCE   2,669,879
POWER TRANSMISSION CHAIN
Filed July 6, 1951   10 Sheets-Sheet 7
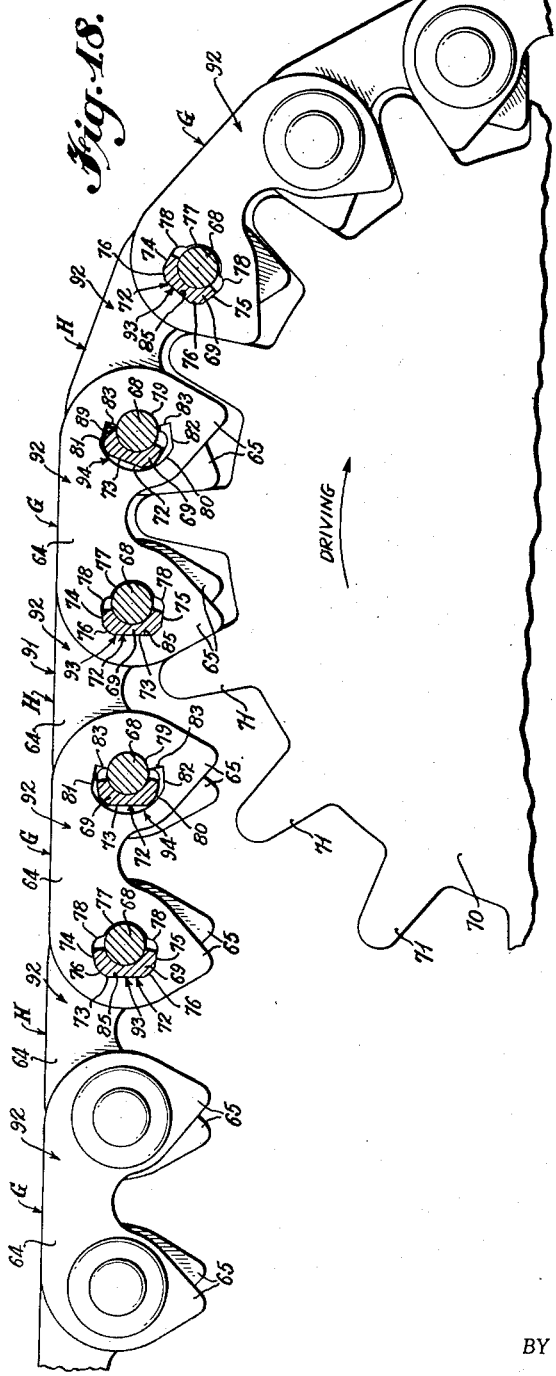
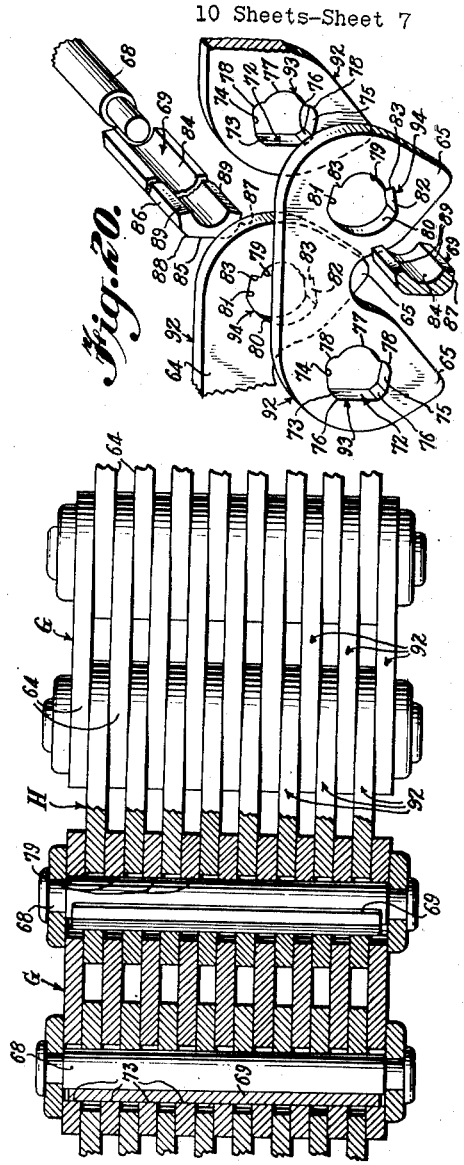
INVENTOR
Harold S. Pierce
BY
ATTORNEY Feb. 23, 1954 — H. S. PIERCE — 2,669,879
POWER TRANSMISSION CHAIN
Filed July 6, 1951 — 10 Sheets-Sheet 8
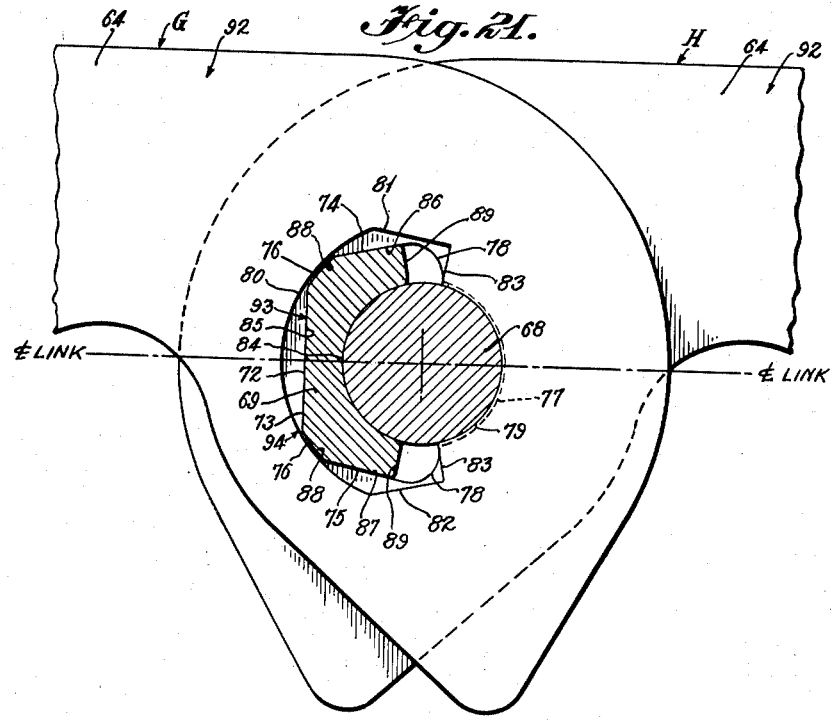
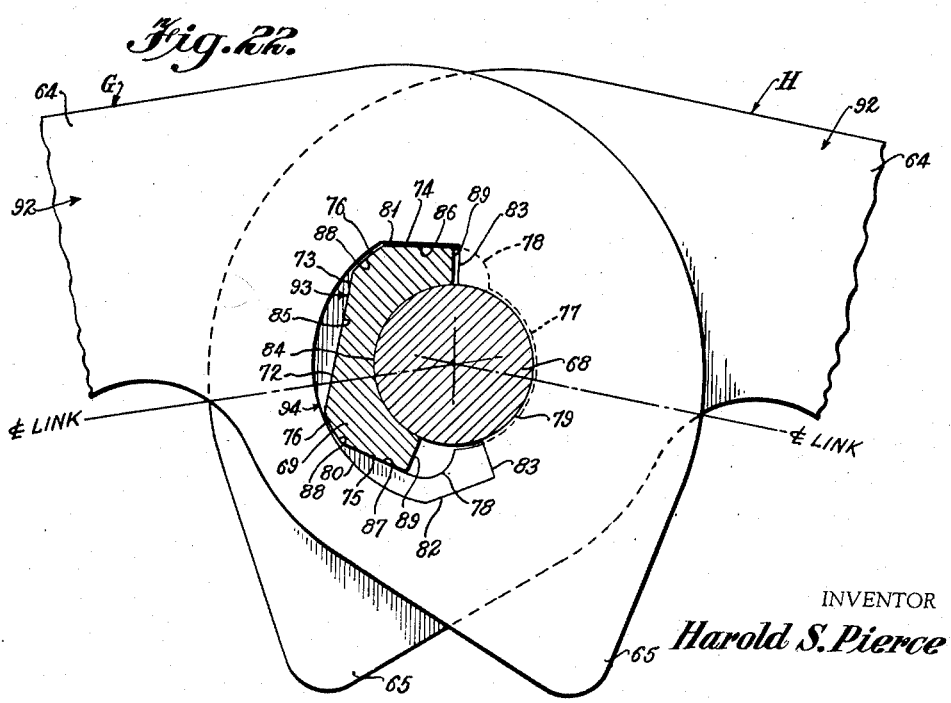
INVENTOR
Harold S. Pierce
BY
ATTORNEY Feb. 23, 1954　　　H. S. PIERCE　　　2,669,879
POWER TRANSMISSION CHAIN
Filed July 6, 1951　　　　　　　　　10 Sheets-Sheet 9
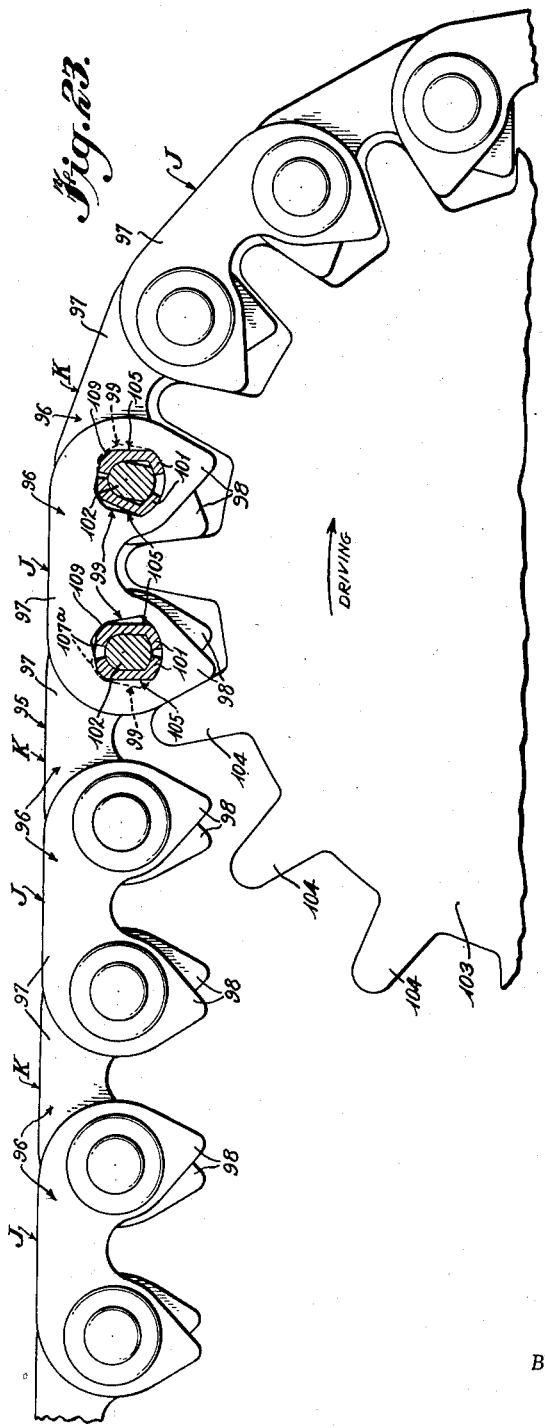
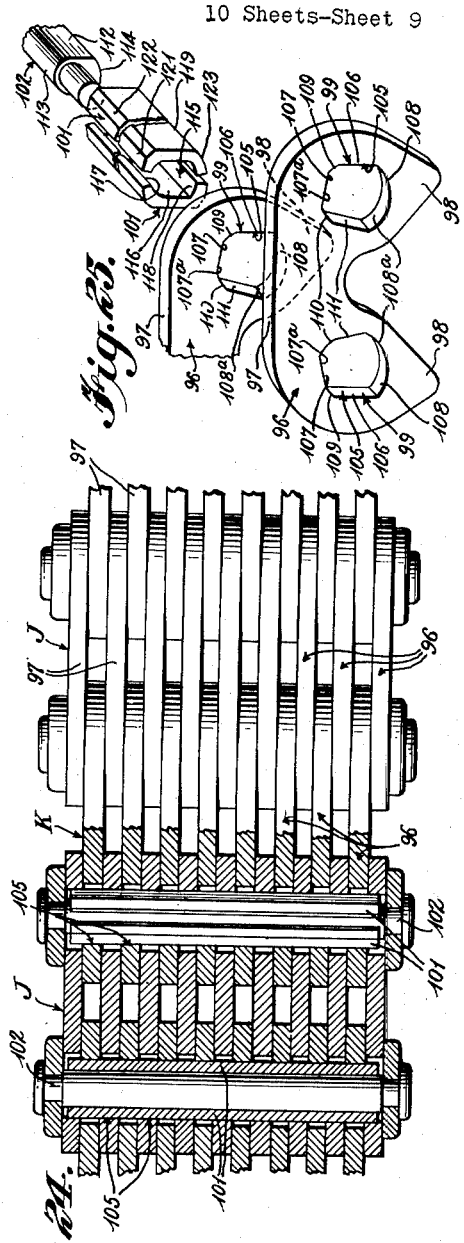
INVENTOR
*Harold S. Pierce*
BY
ATTORNEY

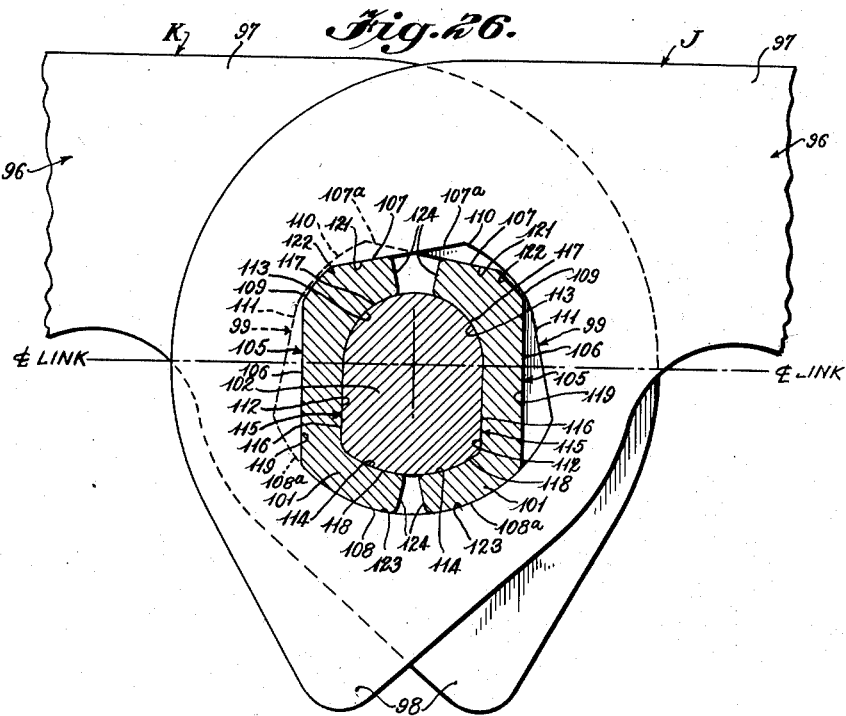
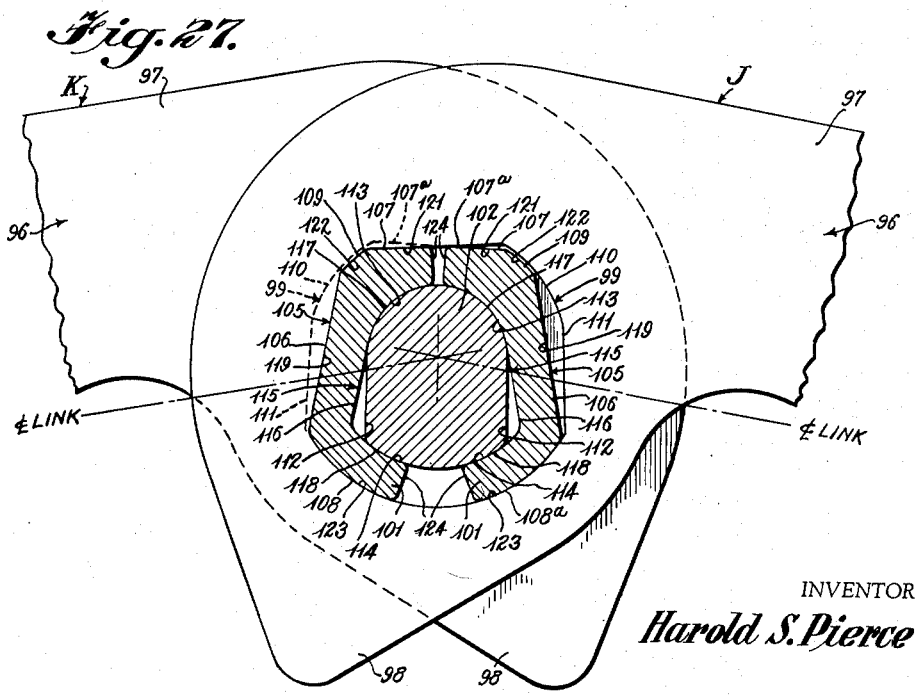

Patented Feb. 23, 1954

2,669,879

UNITED STATES PATENT OFFICE 2,669,879

POWER TRANSMISSION CHAIN

Harold S. Pierce, Indianapolis, Ind., assignor to Link-Belt Company, a corporation of Illinois Application July 6, 1951, Serial No. 235,420

18 Claims. (Cl. 74—253)

This invention relates to new and useful improvements in power transmission chains and deals more particularly with the joint construction of chains of the silent type.

It is the conventional practice in the manufacture of silent chains to incorporate a plurality of links in each pitch of the chain with the links being spaced laterally across the width of the pitch and the associated end portions of the links of adjacent pitches being overlapped in intermeshing relationship. In general, the most satisfactory type of joint construction for the overlapped end portions of adjacent pitches consists of a chain pin and one or two liners. The pin and liner, or liners, are inserted in the alined apertures formed in the overlapped end portions of the links of adjacent pitches with each liner positioned between the pin and the aperture surfaces of the links of one of the pitches to provide a bearing surface for the articulation of those links about the axis of the pin.

The above described conventional joint construction offers several advantages over other types of joints among the more important of which is the provision of an unbroken bearing surface of ample area across the width of the chain to insure long wear-life and so that the load on each pitch of the chain will be uniformly distributed thereacross. Each joint is open to lubrication across the width of the chain and the center of articulation for all links is retained throughout the life of the chain.

The above mentioned advantages, and particularly the last one, are dependent upon the functioning of the liners as a part of the links of the pitch with which they are directly associated. In other words, any relative movement between a joint liner and its associated links will cause wear in the joint with the result that the centers of articulation between pitches will shift during operation of the chain.

Various locking means have been employed in the past to prevent relative movement between the liners and the associated links to which they are intended to be immovably secured but in every instance the locking means have failed in some respect to accomplish the desired result. One of the more successful types of these conventional joints provides lugs which are integral with the links and projects into the joint apertures for engagement with the edges of the liners to lock the liners against movement relative to the links. The disadvantages experienced with this type of joint construction are that if, due to normal manufacturing tolerances, even a slight angular movement is permitted between a liner and the links to which it is intended to be locked, the shifting of the liner relative to its links, as the joint articulates, will produce wear that eventually will destroy the efficiency of the chain; the permissible area of pin contact that can be provided by the liner is limited by the presence of the locking lugs; and the free flow of lubricant across the width of the chain is obstructed by the locking lugs.

It is the primary object of this invention to provide silent chains which have their adjacent pitches connected for articulation by joint parts that are constructed so as to substantially reduce the type of joint wear which causes elongation of the chains to thereby increase the useful life of the chains.

A further important object of the invention is to provide joint parts for silent drive chains with at least one of the parts of each joint having a bearing surface for engaging links of one of the connected pitches in such a manner as to prevent relative movement between the engaging surfaces and to provide a maximum load bearing area.

Another important object of the invention is to provide joint structures for silent drive chains which will permit the free and unobstructed flow of lubricant across the entire width of the joint and which will provide a maximum area of contact between relatively moving parts.

Other objects and advantages of the invention will be apparent during the course of the following description.

In the accompanying drawings forming a part of this specification and in which like numerals are employed to designate like parts throughout the same, Figure 1 is a side elevational view, with certain parts in section, of a length of silent drive chain and sprocket embodying the invention, Figure 2 is a partly plan and partly sectional view taken on line 2—2 of Fig. 1.

Figure 17:
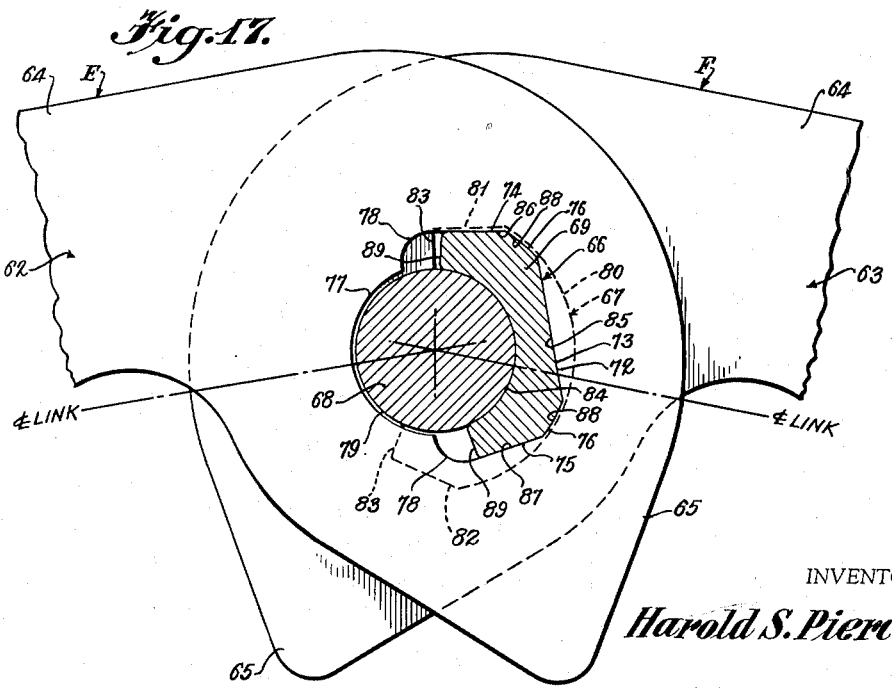

Figure 3 is an exploded view of adjacent links and a portion of one of the chain joints illustrated in Fig. 1, Figure 4 is an enlarged side elevational view showing a joint of the chain illustrated in Fig. 1 with the adjacent pitches of links arranged in a straight-line position, Figure 5 is a similar view to Fig. 4 but illustrates the relationship of the joint elements when the adjacent pitches of links are articulated out of a straight-line position, Figure 6 is a side elevational view, partly broken away, of a duplex type of silent drive chain and sprockets embodying a modification of the invention, Figure 7 is a transverse sectional view taken on line 7—7 of Fig. 6, Figure 8 is an exploded view of adjacent links and a portion of one of the chain joints illustrated in Fig. 6, Figure 9 is an exploded view of a joint pin and its liners of the chain illustrated in Fig. 6, Figure 10 is an enlarged side elevational view showing a joint of the chain illustrating in Fig. 6 with the adjacent pitches of links arranged in a straight-line position, Figure 11 is a similar view to Fig. 10 but illustrates the relationship of the joint elements when the adjacent pitches of links are articulated out of a straight-line position in one direction, Figure 12 is a similar view to Fig. 10 but illustrates the relationship of the joint elements when the adjacent pitches of links are articulated in the opposite direction from that illustrated in Fig. 11, Figure 13 is a side elevational view of a length of silent drive chain and sprocket showing in cross-section certain of the chain joints embodying a further modification of the invention, Figure 14 is a partly plan and partly sectional view of the chain illustrated in Fig. 13, Figure 15 is an exploded view of adjacent links and a portion of one of the chain joints illustrated in Fig. 13, Figure 16 is an enlarged side elevational view showing a joint of the chain illustrated in Fig. 13, with the adjacent pitches of links arranged in a straight-line position, Figure 17 is a similar view to Fig. 16 but illustrates the relationship of the joint elements when the adjacent pitches of links are articulated out of a straight-line position, Figure 18 is a side elevational view of a length of silent drive chain and sprocket showing in cross-section certain of the chain joints embodying a still further modification of the invention, Figure 19 is a partly plan and partly sectional view of the chain illustrated in Fig. 18, Figure 20 is an exploded view of adjacent links and a portion of one of the chain joints illustrated in Fig. 18, Figure 21 is an enlarged side elevational view showing a joint of the chain illustrated in Fig. 18 with the adjacent pitches of links arranged in a straight-line position, Figure 22 is a similar view to Fig. 21 but illustrates the relationship of the joint elements when the adjacent pitches of links are articulated out of a straight-line position, Figure 23 is a side elevational view of a length of silent drive chain and sprocket showing in cross-section certain of the chain joints embodying still another modification of the invention, Figure 24 is a partly plan and partly sectional view of the chain illustrated in Fig. 23, Figure 25 is an exploded view of adjacent links and a portion of one of the chain joints illustrated in Fig. 23, Figure 26 is an enlarged side elevational view showing a joint of the chain illustrated in Fig. 23 with the adjacent pitches of links arranged in a straight-line position, and Figure 27 is a similar view to Fig. 26 but illustrates the relationship of the joint elements when the adjacent pitches of links are articulated out of a straight-line position.

In the drawings, wherein for the purpose of illustration are shown the preferred embodiments of this invention, and first particularly referring to Figs. 1 to 5, inclusive, there is illustrated a length of silent drive chain 28 that includes the alternate pitches A and B, each one of which is made up of a suitable number of drive links 29. Each one of these drive links 29 is of arched form for providing a back part 30 and two spaced standing parts 31 that are shaped to provide drive teeth. The standing parts 31 of the links of adjacent pitches A and B are arranged in overlapped relationship with the links of each pitch alternating with the links of the adjacent pitches transversely of the chain 28. It is to be understood that the number and arrangement of links 29 in adjacent pitches A and B may be varied in the conventional manner to meet the requirements of particular installations.

Formed in the two standing or tooth shaped parts 31 of each link 29 are pitch holes 32 which are transversely alined in the adjacent pitches of links to receive a pair of joint liners 33 and a pin 34 which connect the adjacent pitches A and B for articulating movement when the chain passes around a sprocket 35 having teeth 36 for engaging the standing parts 31 of the links.

Referring now to Figs. 4 and 5 for a detail description of the pitch holes 32, liners 33 and pin 34, and the manner in which they cooperate to form a joint between one pair of adjacent pitches A and B, Fig. 4 illustrates the adjacent pitches arranged in a straight-line position or with the line of centers between the axes of articulation of the adjacent pitches forming a straight line.

Each of the pitch holes 32 of all of the links is so formed as to provide a bearing surface 37 on the side of the pitch hole adjacent the nearest end of its link 29. The middle portion of the bearing surface 37 is normal to the line of centers of the link in which it is formed to provide a load carrying land 39. The depth of this land 39 is substantially equal to the diameter of the pin 34. Spaced circumferentially of the ends of the load carrying land 39 the bearing surface 37 is provided with flat wedging portions 40 and 41, respectively, which lie at obtuse angles with the land 39. Arcuate surfaces 42 extend between and connect the ends of the land 39 and the adjacent ends of the wedging surfaces 40 and 41.

On the side of the pitch hole opposite to the bearing surface 37, an arcuate surface 43 is formed at a radius slightly greater than the radius of the arcuate surfaces 42. That portion of the arcuate surface 43 which lies above the line of centers of the link in which it is formed is longer than the portion which lies below the line of centers, as illustrated in Figs. 4 and 5. The wedging surface 40 is of sufficient length to provide an articulation control portion 40a which connects with the arcuate surface 43 at the upper end of the latter. The adjacent ends of the arcuate surface 43 and the wedging surface 41 are connected by an articulation control surface 44 which converges toward the line of centers from the wedging surface 41.

The bearing surfaces 37 of the alined pitch holes 32 in the links of adjacent pitches A and B lie on opposite sides of the pin 34 which is positioned in the said pitch holes. Two liners 33 are positioned in and extend entirely through the alined pitch holes of a joint and are arranged on opposite sides of the pin 34, or between the pin and the bearing surfaces 37 of the links of the pitches A and B. The inner surface 33a of each liner 33 conforms in shape with the opposed peripheral surface of the pin 34 for bearing engagement therewith.

The outer surfaces of the liners 33 are formed with centrally located load carrying lands 45 for engagement with the load carrying lands 39 of the pitch holes 32. Wedging surfaces 46 and 47 are spaced circumferentially of the ends of the land 45 for engagement with the wedging surfaces 40 and 41, respectively, of the pitch holes 32. The wedging surfaces 46 and 47 are arranged at the same obtuse angles with respect to their associated land 45 as the angles between the wedging surfaces 40 and 41 and their associated land 39. Arcuate surfaces 48 extend between and connect the edges of the land 45 and the adjacent edges of the wedging surfaces 46 and 47.

The distance between the wedging surfaces 46 and 47 of the liners 33 is, however, slightly greater than the distance between the wedging surfaces 40 and 41 of the pitch holes 32. Initial contact between the wedging surfaces 40 and 46 and between the wedging surfaces 41 and 47 will, therefore, prevent engagement between the load carrying lands 39 and 45. When the chain is placed under a substantial load, however, the load carrying lands 39 and 45 will be moved into engagement and the relative movement between the wedging surfaces of the liners 33 and pitch holes 32 will wedge each of the liners into a fixed position relative to the links 29 of its associated pitch.

The edges of the inner surface 33a of each liner 33 are joined to the edges of the wedging surfaces 46 and 47 by radial surfaces 49 and the circumferential dimensions of the liners 33 are such that when the liners are positioned on opposite sides of the pin 34, the radial surfaces 49 of each liner are spaced from the opposed radial surfaces of the other liner. This spacing between opposed radial surfaces 49 permits movement of the liners 33 in opposite circumferential directions relative to the pin 34 for a distance sufficient to permit the necessary articulation between adjacent pitches A and B of the chain.

Considering now the functions and relationships of the various joint parts, it has been previously pointed out that the placing of a substantial load on the chain 28 will cause each of the liners 33 to be compressed between the bearing surfaces 37 of the pitch holes 32 and the chain pin 34. This effects a wedging engagement between the wedging surfaces 40 and 46 and between the wedging surfaces 41 and 47 and moves the load carrying land 45 of each liner into engagement with the load carrying lands 39 of the pitch holes 32 in the links of the associated pitch. A major portion of the chain load is, therefore, carried by the engagement of the load carrying lands 39 and 45. The wedging action of the surfaces 40 and 46 and the surfaces 41 and 47 substantially prevents any looseness or wear between the liners 33 and links 29 with which they are associated.

As illustrated in Fig. 4, when the adjacent pitches A and B are in a straight line position, the wedging surface 47 of the liner 33 associated with one pitch of the chain is in contact with the articulation control surfaces 44 of the links of the other pitch of the chain. This contact prevents back-bending of the joints of the chain 28. It also will be noted that the arcuate surfaces 48 of the liners 33 normally are spaced from the arcuate surfaces 43 of the pitch holes 32 to permit angular movement of the liners 33 without frictional engagement between surfaces. When the chain is unloaded, however, engagement between the arcuate surfaces 48 of the liners 33 and the arcuate surfaces 43 of the pitch holes 32 will prevent undue play or looseness between the connected pitches A and B.

Referring now to Fig. 5 for a description of the relative action between joint parts when adjacent pitches of the chain are articulated, it will be noted that relative rotary movement of the pitches A and B about the axis of the pin 34 will effect relative rotary movement of the liners 33 about the axis of the pin. This movement will substantially reduce the clearance between the opposed radial surfaces 49 at the top of the pin and will move the wedging surface 46 of each liner into engagement with the articulation control surface portions 40a of the pitch holes 32 in the links of the other pitch. The articulation control surfaces 40a, therefore, limit the extent to which the connected pitches A and B may be articulated in one direction.

Figs. 6 to 12, inclusive, illustrate a modification of the invention adapted for use in connection with silent chains of the duplex type in which both faces of the chain engage sprockets. Referring first to Figs. 6 and 7, alternate pitches C and D of the chain 50 are each formed of a plurality of identical links 51 having back parts 52 and standing or tooth shaped portions 53 at their opposite ends. The links 51 of adjacent pitches C and D have their end portions overlapped and arranged in groups of four with each group being formed of two links for each pitch and with the alternate groups transversely of the chain having their tooth shaped portions 53 arranged on opposite faces of the chain.

The chain 50 is adapted to be trained over a driven sprocket 54 and a driving sprocket 55, as illustrated, so that the chain joints must be able to articulate in both directions from a straight-line position of the chain. The sprocket 54 is provided with axially spaced, circumferential rows of teeth 56 for engaging alternate groups of links having their standing portions on one face of the chain and the sprocket 55 is provided with axially spaced, circumferential rows of teeth 57 for engaging the remaining groups of links having their standing portions 53 on the opposite face of the chain. Spacing rings 58 are positioned between the adjacent groups of four links to provide clearance for the teeth 56 and 57 engaging the standing portions 53 of the links.

Referring now to Figs. 10 to 12, inclusive, it will be noted that the liners 33 and pin 34 which form the joint between adjacent pitches C and D are identical to those illustrated in Figs. 1 to 5, inclusive, while the shape of the pitch holes 32 is changed to provide articulation control surfaces or portions 41a which are continuations of their associated wedging surfaces 41. This change produces an increase in the length of the arcuate surface 53 in each pitch hole 32. Otherwise, the same reference characters have been applied to the remaining identical parts of the structure.

It will be noted that the changed location of the articulation control surfaces 41a provides clearance for movement of the associated liners 33 to permit articulation between adjacent pitches C and D in both directions from the straight-line position of the chain 45. In other words, when the chain is in its straight-line position, as illustrated in Fig. 10, neither of the wedging surfaces 46 and 47 of the liner 33 that is fixed with respect to the links of one pitch of the chain is in contact with the articulation control surfaces 40a and 41a of the links of the adjacent pitch of the chain. This clearance between the wedging surfaces 46 and 47 and the articulation control surfaces 40a and 41a, respectively, permits articulation of the adjacent pitches in opposite directions from the straight-line position of the chain as illustrated in Figs. 11 and 12. It, also, will be noted that the spacing between opposed radial surfaces 49 of the liners 33 permits movement of the liners 33 in opposite circumferential directions relative to the pin 34 for a distance sufficient to permit the necessary articulation between adjacent pitches C and D of the chain in either direction from its straight-line position.

Figs. 13 to 17, inclusive, illustrate a still further modification of the invention. In this form, the length of silent drive chain 61 includes alternate pitches E and F each one of which is made up of a suitable number of drive links 62 and 63, respectively. The links 62 and 63 are of arched form for providing back parts 64 and two spaced standing parts 65 that are shaped to provide drive teeth on one face of the chain. The standing parts of the links 62 of each pitch E are arranged in overlapped relationship with the standing parts of the links 63 of the adjacent pitch F and the overlapped end portions are alternated transversely of the chain 61.

Each one of the links 62 is provided with a pitch hole 66 through each of its standing parts 65 while each one of the links 63 is provided with a pitch hole 67 through each of its standing parts. The pitch holes 66 and 67 are transversely alined for adjacent pitches to receive a chain pin 68 and a joint liner 69 which connect the adjacent pitches for articulating movement when the chain passes around a sprocket 70 having teeth 71 for engaging the standing parts 65 of the links.

By inspecting Figs. 13 to 15, inclusive, it will be seen that each chain joint is provided with only one liner 69 and that both of the pitch holes 66 of the links 62 are so shaped that the single liners are fixed against angular movement relative to these links. The pitch holes 67 of the links 63, however, are so shaped that articulation may occur between these links and the single liners. This type of structure, therefore, causes the links 62 to bear on the pins through the liners of both of its joints while the links 63 bear directly on the pins. This type of single liner joint is not basically new in the art and, for that reason, its mode of operation and advantages need not be specifically recited other than the direct bearing they have on the present invention.

Referring now to Figs. 16 and 17 for a detail description of the alined pitch holes 66 and 67, liner 69 and pin 68 and the manner in which they cooperate to form a joint between the links of one pair of adjacent pitches E and F, Fig. 16 illustrates the pitches arranged in a straight-line position. Each of the pitch holes 66 in the links 62 is formed to provide a bearing surface 72 on the side of the pitch hole adjacent the nearest end of its link 62. The middle portion of each bearing surface 72 is normal to the line of centers of the link in which it is formed to provide a load carrying land 73. The depth of this load carrying land 73 is substantially equal to the diameter of the pin 68. Spaced circumferentially of the ends of the load carrying land 73, the bearing surface 72 is provided with flat wedging portions 74 and 75 which lie at obtuse angles with the land 73. Arcuate surfaces 76 extend between and connect the ends of the land 73 and the adjacent ends of the wedging surfaces 74 and 75.

On the side of the pitch hole 66 opposite to the bearing surface 72, an arcuate surface 77 is formed at a radius slightly greater than the radius of the pin 68. The ends of the arcuate surface 77 are connected to the adjacent ends of the wedging surfaces 74 and 75, respectively, by rounded surfaces 78 extending substantially radially outwardly from the ends of the arcuate surface.

Each of the pitch holes 67 in the links 63 is formed to provide a bearing surface 79 on the side of the pitch hole adjacent the nearest end of its link 63. The bearing surface 79 is arcuate in form and has a radius equal to that of the pin 68. The length of the bearing surface 79 is less than one-half of the diameter of the pin 68 and the bearing surface is centered on the line of centers of its link 63.

On the side of each pitch hole 67 opposite to the bearing surface 79, an arcuate surface 80 is formed at a radius slightly greater than the radius of the arcuate surfaces 76 of the pitch hole 66. Two flat articulation control surfaces 81 and 82 extend, respectively, from the ends of the arcuate surface 80 to points radially outwardly of the ends of the arcuate bearing surface 79. Radial surfaces 83 extend between and connect the ends of the bearing surface 79 and the adjacent ends of the articulation control surfaces 81 and 82.

The bearing surfaces 72 and 79 of the alined pitch holes 66 and 67, respectively, in the links of adjacent pitches E and F lie on opposite sides of the pin 68 which is positioned in the said pitch holes. The pin 68 is adjacent to and in bearing contact with the bearing surfaces 79 and is spaced from the bearing surfaces 72. A liner 69 is positioned in and extends entirely through the alined pitch holes of a joint and is arranged between the pin and the bearing surfaces 72 of the links 62 of the pitch E. The inner surface 84 of each liner 69 conforms in shape with the opposed peripheral surface of the pin 68 for bearing engagement therewith.

The outer surface of the liner 69 is formed with a centrally located load carrying land 85 for engagement with the load carrying lands 73 of the pitch holes 66 in the links 62 of the pitch E. Wedging surfaces 86 and 87 are spaced circumferentially of the ends of the land 85 for engagement with the wedging surfaces 74 and 75, respectively, of the pitch holes 66. The wedging surfaces 86 and 87 are arranged at the same obtuse angles with respect to their associated land 85 as the angles between the wedging surfaces 74 and 75 and their associated land 73. Arcuate surfaces 88 extend between and connect the edges of the land 85 and the adjacent edges of the wedging surfaces 86 and 87.

The relationship and function of the outer surface of the liner 69 and the bearing surfaces 79 of the pitch holes 67 are identical to those of any one of the liners 33 and pitch holes 32 of the modification of the invention illustrated in Figs. 1 to 5, inclusive, and will not be described again. The edges of the inner surface 84 of the liner 69 are joined to the edges of the wedging surfaces 86 and 87 by radial surfaces 89. With the exception that these radial surfaces 89 are opposed by radial surfaces 83 of the pitch holes 67 in the links 63, their arrangement and functions are identical to those previously described in connection with the radial surfaces 49 of the liners 33 illustrated in Figs. 1 to 5, inclusive.

Since only one liner 69 is utilized in a joint of the chain 61, no articulation control surfaces are required in the pitch holes 66. The wedging surfaces 86 and 87 of the single liner cooperate with the articulation control surfaces 81 and 82 of the pitch holes 67 to limit articulation between adjacent pitches in a manner identical to that described for the modification of the invention illustrated in Figs. 1 to 5, inclusive.

Figs. 18 to 22, inclusive, illustrate a further modification of the invention in which the silent type drive chain 91 is formed of alternate pitches G and H, each one of which is made up of a suitable number of identical drive links 92. The manner in which the drive links 92 are shaped and arranged is similar to that of the chain 61 illustrated in Figs. 13 to 17, inclusive, with the pitches G and H of the chain 91 corresponding to the pitches E and F, respectively, of the chain 61. The pitch holes 93 at the trailing ends of the links 92 are identical to the pitch holes 66 in the links 62 of the chain 61 and the pitch holes 94 at the leading ends of the links 92 are identical to the pitch holes 67 in the links 63 of the chain 61. In other words, the form and arrangement of the joint parts of each joint of the chain 91 are identical to those of the joint parts at the trailing end of each pitch E of the chain 61. The same reference characters have been applied to the parts of the chain 91 which correspond to those of the chain 61.

Figs. 23 to 27, inclusive, illustrate a length of silent drive chain 95 embodying a still further modification of the invention. The drive chain 95 includes alternate pitches J and K, each one of which is made up of a suitable number of drive links 96 that are of arched form to provide a back part 97 and two spaced standing parts 98 shaped to provide drive teeth. The standing parts 98 of adjacent pitches J and K are arranged in overlapped relationship with the links of each pitch alternating with the links of adjacent pitch transversely of the chain.

Formed in the two standing or tooth shaped parts 98 of each link 96 are pitch holes 99 which are transversely alined in the adjacent pitches of links to receive a pair of joint liners 101 and a pin 102 which connect the adjacent pitches J and K for articulating movement when the chain passes around a sprocket 103 having teeth 104 for engaging the standing parts 98 of the links.

Referring now to Figs. 26 and 27 for a detail description of the pitch holes 99, liners 101 and pin 102, and the manner in which they cooperate to form a joint between one pair of adjacent pitches J and K, Fig. 26 illustrates the adjacent pitches arranged in a straight-line position while Fig. 27 illustrates said pitches articulated.

Each of the pitch holes 99 is formed to provide a bearing surface 105 on the side of the pitch hole adjacent the nearest end of its link 96. The middle portion of the bearing surface 105 is normal to the line of centers of its link to provide a load carrying land 106. The depth of this land 106 is substantially equal to the depth of the pin 102. Spaced circumferentially of the upper end of the load carrying land 106, the bearing surface 105 is provided with a flat wedging portion 107 which lies at an obtuse angle with the land 106. An arcuate wedging portion 108 of the bearing surface 105 extends circumferentially from the lower end of the land 106. The wedging surface 108 is continued at a uniform radius to provide a control surface 108a which terminates on the side of the pitch hole 99 opposite to the bearing surface 105. One end of the upper wedging surface 107 is connected to the adjacent end of the land 106 by an arcuate surface 109 and the other end of the wedging surface is extended to form an articulation control surface 107a.

On the side of the pitch hole 99 opposite to the bearing surface 105, an arcuate surface 110 is formed at a radius slightly greater than the radius of the arcuate surface 109 and extends from the end of the articulation control surface 107a downwardly to a point at substantially the same distance above the line of centers of its link 96 as the upper end of the land 106. Adjacent ends of the arcuate and control surfaces 110 and 108a, respectively, are connected by a plane surface 111.

The bearing surfaces 105 of the alined pitch holes 99 in the links 96 of adjacent pitches J and K lie on opposite sides of the pin 102 which is positioned in the said pitch holes. The sides 112 of the pin 102 which oppose the load carrying lands 106 are flattened and are normal to the lines of centers of the links 96 through which the pin extends when the connected pitches are in a straight-line position.

The top surface 113 of the pin 102 is rounded at a radius which may be equal to one-half the distance between the flattened sides 112 of the pin, and the bottom surface 114 of the pin is rounded at a radius which may be greater than that of the top surface. The flattened sides 112 and the rounded top surface 113 of the pin act as load bearing surfaces and the rounded bottom surface 113 functions as a control surface as later will be described.

The two liners 101 are positioned in and extend entirely through the alined pitch holes 99 on opposite sides of the pin 102 or between the pin and the bearing surfaces 105 of the links 96 of the pitches J and K. The inner surface 115 of each liner 101 is formed with a centrally located land 116 for engagement with one flattened side 112 of the pin. Arcuate surfaces 117 and 118 adjacent the upper and lower ends, respectively, of the land 116 are each formed at a radius equal to that of the adjacent top and bottom surfaces 113 and 114, respectively, of the pin 102. When the pitches J and K are in their straight-line position, therefore, the inner surfaces 115 of the liners 101 are in full engagement with the pin 102 as illustrated in Fig. 26. The outer surfaces of the liner 101 are formed with centrally located load carrying lands 119 for engagement with the load carrying lands 106 of the pitch holes 99. A flat wedging surface 121 is spaced circumferentially of the upper end of the land 119 of each liner 101 and is arranged at the same obtuse angle with the land 119 as the angle between the pitch hole wedging surface 107 and its associated land 106. An arcuate wedging surface 123 extends circumferentially from the lower end of the land 119 at a radius equal to that of the arcuate wedging surface 108 of each pitch hole 99.

The distance between the wedging surfaces 121 and 123 of the liners 101 is, however, slightly greater than the distance between the wedging surfaces 107 and 108 of the pitch holes 99. Initial contact between the wedging surfaces 107 and 121 and between the wedging surfaces 108 and 123 will, therefore, prevent engagement between the load carrying lands 106 and 119. When the chain is placed under a substantial load, however, the load carrying lands 106 and 119 will be moved into engagement and the relative movement between the wedging surfaces of the liners 101 and the pitch holes 105 will wedge each of the liners into a fixed position relative to the links 96 of its associated pitch.

The ends of the inner arcuate surfaces 117 and 118 of each liner 101 are joined to the ends of the wedging surfaces 121 and 123 by radial surfaces 124 and the circumferential dimensions of the liners are such that when the liners are positioned on opposite sides of the pin 102, the radial surfaces 124 of each liner are spaced from the opposed radial surfaces of the other liner. This spacing between opposed radial surfaces 124 permits movement of the liners 101 in opposite circumferential directions relative to the pin 102 for a distance sufficient to permit the necessary articulation between adjacent pitches J and K of the chain. It will be noted, however, that engagement of the land 116 on the inner surface 115 of the liner with the flattened side 112 of the pin 102 will prevent circumferential movement of the liner 101 in one direction relative to the pin so that there can be no back-bending or joint action between the adjacent pitches J and K of the chain.

When the chain is under a load in a straight-line position, as illustrated in Fig. 26, the flattened sides 112 of the pin support substantially the entire chain load by engagement with the lands 116 of the inner surfaces 115 of the liners. When the adjacent pitches J and K articulate in passing over the sprocket 103, however, the liners 101 are moved relative to the pin 102, as illustrated in Fig. 27. This relative movement is in a circumferential direction and is controlled or directed by contact between the rounded bottom surface 114 of the pin and the arcuate inner surfaces 118 of the liners. The arcuate inner surfaces 117 of the liners will, therefore, move circumferentially along the rounded top surface 113 of the pin while in frictional engagement therewith and the lands 116 of the inner surfaces 115 of the liners will move angularly away from the flattened sides 112 of the pin. When the chain is articulated, therefore, the engagement between the arcuate surfaces 113 and 117 of the pin 102 and liners 101, respectively, supports substantially the entire chain load.

It will be noted that since there is no frictional engagement between the surfaces 116 and 112 of the liners 101 and pin 102, respectively, when they are moved relative to each other, wearing of these surfaces is reduced to an absolute minimum so there can be substantially no elongation of the chain due to wearing of the joint parts.

Articulation of the chain in the direction illustrated in Fig. 27 is limited by movement of the wedging surfaces 121 of the liners 101 into engagement with the articulation control surfaces 107a in the pitch holes 99 of the links 96.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

I claim:

1. In a drive chain of the silent type, a pair of pitches of links having their adjacent end portions overlapped and transversely alined pitch holes through said overlapped end portions, the pitch holes of the links of one pitch each having a bearing surface at its side nearest the adjacent end of its link, and articulating joint parts connecting said overlapped end portions comprising a pin extending through said alined pitch holes, and a liner interposed between the pin and the aforesaid bearing surfaces having a bearing surface on its periphery engaging the said pitch hole bearing surfaces, said liner and pitch hole bearing surfaces having cooperating medially located load carrying lands normal to the line of centers of said one pitch and also having cooperating wedging portions circumferentially spaced from the opposite ends of said lands for preventing relative movement between the liner and the links of said one pitch, and the pitch holes of the links of the adjacent pitch being shaped to provide clearance for said liner to permit articulation at the joint and each having a surface movable into engagement with a wedging portion of the liner bearing surface to limit the extent of articulation at said joint.

2. In a drive chain of the silent type, a pair of pitches of links having their adjacent end portions overlapped and transversely alined pitch holes through said overlapped end portions, the pitch holes of the links of one pitch each having a bearing surface at its side nearest the adjacent end of its link, and articulating joint parts connecting said overlapped end portions comprising a pin extending through said alined pitch holes, and a liner interposed between the pin and the aforesaid bearing surfaces having a bearing surface on its periphery engaging the said pitch hole bearing surfaces, said liner and pitch hole bearing surfaces having cooperating medially located load carrying lands normal to the line of centers of said one pitch, said lands each having a depth substantially equal to the pin diameter that is parallel to said lands, said liner and pitch hole bearing surfaces also having cooperating wedging portions circumferentially spaced from the opposite ends of said lands for preventing relative movement between the liner and the links of said one pitch, and the pitch holes of the links of the adjacent pitch being shaped to provide clearance for said liner to permit articulation at the joint.

3. In a drive chain of the silent type, an articulation joint for the links of adjacent pitches which have their end portions overlapped and formed with transversely alined pitch holes, comprising a pin extending through the alined pitch holes, a liner in the pitch holes bearing longitudinally along one side of the pin, the periphery of the liner and one side of all of the pitch holes in the links of one adjacent pitch having complemental engaging bearing surfaces formed with medially located load carrying lands and with wedging surface portions circumferentially spaced from the opposite ends of said lands to fix the liner against angular movement relative to the links of said one pitch during joint articulation, and the corresponding sides of all of the pitch holes in the links of the second adjacent pitch each being shaped to allow relative angular movement between the liner and the links of said second adjacent pitch during joint articulation and having a surface movable into engagement with a wedging portion of the liner bearing surface to limit the extent of articulation at said joint.

4. In a drive chain of the silent type, an articulation joint for the links of adjacent pitches which have their end portions overlapped and formed with transversely alined pitch holes, comprising a pin extending through the alined pitch holes, liners in the pitch holes bearing longitudinally along opposite sides of the pin, the periphery of each one of the liners and the opposed sides of all of the pitch holes in the links of one of the adjacent pitches having complemental engaging bearing surfaces formed with medially located load carrying lands and with wedging surface portions circumferentially spaced from the opposite ends of said lands to fix the liner against angular movement relative to the links of its one pitch during joint articulation, and the remaining sides of all of the pitch holes in the links of both of the adjacent pitches each being shaped to allow relative angular movement between the liners and the links of said adjacent pitches during joint articulation and the pitch holes in the links of one pitch each having a surface movable into engagement with a wedging portion of the bearing surface of the liner associated with the other pitch to limit the extent of articulation at said joint.

5. In a drive chain of the silent type, a pair of pitches of links having their adjacent end portions overlapped and transversely alined pitch holes through said overlapped end portions, each of said pitch holes having a bearing surface at its side nearest the adjacent end of its link, and articulating joint parts connecting said overlapped end portions comprising a pin extending through said alined pitch holes, and a liner interposed between the pin and the pitch hole bearing surfaces of the links of each one of said pitches having a bearing surface on its periphery engaging the said pitch hole bearing surfaces of the links of its associated pitch, said cooperating liner and pitch hole bearing surfaces having medially located load carrying lands normal to the line of centers of their pitch, said lands each having a depth substantially equal to the pin diameter that is parallel to said lands, said liner and pitch hole bearing surfaces also having cooperating wedging portions circumferentially spaced from the opposite ends of said lands for preventing relative movement between the liner and its associated links, and the pitch holes of the links of each pitch being shaped to provide clearance for the liner associated with the links of the other pitch to permit articulation at the joint.

6. In a drive chain of the silent type, a pair of pitches of links having their adjacent end portions overlapped and transversely alined pitch poles through said overlapped end portions, the pitch holes of the links of one pitch each having a bearing surface at its side nearest the adjacent end of its link, and articulating joint parts connecting said overlapped end portions comprising a pin extending through said alined pitch holes, and a liner interposed between the pin and the aforesaid bearing surfaces having a bearing surface on its periphery engaging the said pitch hole bearing surfaces, said liner and pitch hole bearing surfaces having cooperating, medially located load carrying lands normal to the line of centers of said one pitch and cooperating wedging portions circumferentially spaced from the opposite ends of said lands for preventing relative movement between the liner and the links of said one pitch, and the pitch holes of the links of the adjacent pitch having an arcuate contact surface for engaging the side of the pin opposite said liner and being shaped to provide clearance for the liner to permit articulation at the joint.

7. In a drive chain of the silent type, an articulation joint for the links of adjacent pitches which have their end portions overlapped and formed with transversely alined pitch holes, comprising a pin extending through the alined pitch holes, a liner in the pitch holes bearing longitudinally along one side of the pin, the periphery of the liner and one side of all of the pitch holes in the links of one adjacent pitch having complemental engaging bearing surfaces formed with medially located load carrying lands and with wedging surface portions circumferentially spaced from the opposite ends of said lands to fix the liner against angular movement relative to the links of said one pitch during joint articulation, and the corresponding sides of all of the pitch holes in the links of the second adjacent pitch each being formed with a circumferentially extending arcuate surface to allow relative angular movement between the liner and the links of said second adjacent pitch during joint articulation and with articulation control surface portions at the opposite ends of said arcuate surface cooperating with the liner wedging surface portions for controlling the extent of joint articulation.

8. In a drive chain of the silent type, an articulation joint for the links of adjacent pitches which have their end portions overlapped and formed with transversely alined pitch holes, comprising a pin extending through the alined pitch holes, liners in the pitch holes bearing longitudinally along opposite sides of the pin, the periphery of each one of the liners and the opposed sides of all of the pitch holes in the links of one of the adjacent pitches having complemental engaging bearing surfaces formed with medially located load carrying lands and with wedging surface portions circumferentially spaced from the opposite ends of said lands to fix the liner against angular movement relative to the links of its one pitch during joint articulation, and the remaining sides of all of the pitch holes in the links of both of the adjacent pitches each being formed with a circumferentially extending arcuate surface to allow relative angular movement between the liners and the links of said adjacent pitches during joint articulation and with articulation control surface portions at the opposite ends of said arcuate surface cooperating with the wedging surface portions of the liners for controlling the extent of joint articulation.

9. In a drive chain of the silent type, a pair of pitches of links having their adjacent end portions overlapped and transversely alined pitch holes through said overlapped end portions, the pitch holes of the links of one pitch each having a bearing surface at its side nearest the adjacent end of its link, and articulating joint parts connecting said overlapped end portions comprising a pin extending through said alined pitch holes, and a liner interposed between the pin and the aforesaid bearing surfaces having a bearing surface on its periphery for engaging the said pitch hole bearing surfaces, said liner and pitch hole bearing surfaces having cooperating medially located load carrying lands normal to the line of centers of said one pitch and cooperating wedging portions circumferentially spaced from the opposite ends of said lands for preventing relative movement between the liner and the links of said one pitch, and the pitch holes of the links of the adjacent pitch each having a surface portion opposing one wedging portion of the peripheral surface of said liner for engagement therewith to limit joint articulation in one direction and being shaped to provide clearance for said liner to permit joint articulation in the other direction.

10. In a drive chain of the silent type, a pair of pitches of links having their adjacent end portions overlapped and transversely alined pitch holes through said overlapped end portions, the pitch holes of the links of one pitch each having a bearing surface at its side nearest the adjacent end of its link, and articulating joint parts connecting said overlapped end portions comprising a pin extending through said alined pitch holes, and a liner interposed between the pin and the aforesaid bearing surfaces having a bearing surface on its periphery for engaging the said pitch hole bearing surfaces, said liner and pitch hole bearing surfaces having cooperating medially located load carrying lands normal to the line of centers of said one pitch and cooperating flat wedging portions circumferentially spaced from the opposite ends of and at an obtuse angle with said lands for preventing relative movement between the liner and the links of said one pitch, and the pitch holes of the links of the adjacent pitch each having a flat surface portion opposing one of the flat wedging portions of said liner for engagement therewith to limit joint articulation in one direction and being shaped to provide clearance for said liner to permit joint articulation in the other direction.

11. In a drive chain of the silent type, a pair of pitches of links having their adjacent end portions overlapped and transversely alined pitch holes through said overlapped end portions, each of said pitch holes having a bearing surface at its side nearest the adjacent end of its link, and articulating joint parts connecting said overlapped end portions comprising a pin extending through said alined pitch holes, and a liner interposed between the pin and the pitch hole bearing surfaces of the links of each one of said pitches having a bearing surface on its periphery for engaging the said pitch hole bearing surfaces of the links of its associated pitch, said cooperating liner and pitch hole bearing surfaces having medially located load carrying lands normal to the line of centers of their pitch and cooperating flat wedging portions circumferentially spaced from and at an obtuse angle with said load bearing lands for preventing relative movement between the liner and the links of its associated pitch, and the pitch holes of the links of each pitch having flat surface portions engageable with one of the flat wedging portions of the liner associated with the other pitch to limit joint articulation in one direction, said pitch holes each being shaped to provide clearance for said liners to permit joint articulation in the other direction.

12. In a drive chain of the silent type, a pair of pitches of links having their adjacent end portions overlapped and transversely alined pitch holes through said overlapped end portions, each of said pitch holes having a bearing surface at its side nearest the adjacent end of its link, and articulating joint parts connecting said overlapped end portions comprising a pin extending through said alined pitch holes, and a liner interposed between the pin and the pitch hole bearing surfaces of the links of each one of said pitches having a bearing surface on its periphery for engaging the said pitch hole bearing surfaces of the links of its associated pitch, said cooperating liner and pitch hole bearing surfaces having medially located load carrying lands normal to the line of centers of their pitch, said lands each having a depth substantially equal to the diameter of said pin, said liners and pitch hole bearing surfaces also having cooperating flat wedging portions circumferentially spaced from the opposite ends of and at an obtuse angle with said load bearing lands for preventing relative movement between each liner and the links of its associated pitch, and the pitch holes of the links of each pitch having flat surface portions engageable with one of the flat wedging portions of the liner associated with the other pitch to limit joint articulation in one direction, said pitch holes each being shaped to provide clearance for said liners to permit joint articulation in the other direction.

13. In a drive chain of the silent type, a pair of pitches of links having their adjacent end portions overlapped and transversely alined pitch holes through said overlapped end portions, each of said pitch holes having a bearing surface at its side nearest the adjacent end of its link, and articulating joint parts connecting said overlapped end portions comprising a pin extending through said alined pitch holes, and a liner interposed between the pin and the pitch hole bearing surfaces of the links of each one of said pitches having a bearing surface on its periphery for engaging the said pitch hole bearing surfaces of the links of its associated pitch, said cooperating liner and pitch hole bearing surfaces having medially located load carrying lands normal to the line of centers of their pitch and cooperating flat wedging portions circumferentially spaced from the opposite ends of and at an obtuse angle with said load bearing lands for preventing relative movement between each liner and the links of its associated pitch, and the pitch holes of the links of each pitch being shaped to provide clearance for the liner associated with the other pitch to permit articulation at the joint in both directions.

14. In a drive chain of the silent type, a pair of pitches of links having their adjacent end portions overlapped and transversely alined pitch holes through said overlapped end portions, each of said pitch holes being symmetrical with the line of centers of its link and having a bearing surface at its side nearest the adjacent end of its link, and articulating joint parts connecting said overlapped end portions comprising a pin extending through said alined pitch holes, and a liner interposed between the pin and the pitch hole bearing surfaces of the links of each one of said pitches having a bearing surface on its periphery for engaging the said pitch hole bearing surfaces of the links of its associated pitch, said cooperating liner and pitch hole bearing surfaces having medially located load carrying lands normal to the line of centers of their pitch and flat wedging portions circumferentially spaced from the opposite ends of and at an obtuse angle with said load bearing lands for preventing relative movement between each liner and its associated pitch, and the pitch holes of the links of each pitch having oppositely arranged articulation control surfaces adapted to engage the wedging portions of the liner associated with the other pitch to limit articulation at the joint.

15. In a drive chain of the silent type, a plurality of pitches of links having their adjacent end portions overlapped and transversely alined pitch holes through said overlapped end portions, the pitch holes of the links of alternate pitches only each having an angular liner engaging bearing surface at its side nearest the adjacent end of its link and the pitch holes of the links of the remaining pitches each having an arcuate bearing surface and being shaped to provide liner clearance to permit chain articulation, and articulating joint parts connecting the overlapped end portions of each pair of adjacent pitches comprising a pin extending through said alined pitch holes in engagement with said arcuate bearing surfaces, and a liner interposed between the pin and the angular bearing surfaces of the said alternate pitch of the connected pair, said liner having a bearing surface on its periphery for engaging the said angular bearing surfaces, said cooperating liner and angular bearing surfaces having medially located load carrying lands normal to the line of centers of their pitch and cooperating wedging portions circumferentially spaced from the opposite ends of said lands for preventing relative movement between the liner and the said alternate pitch.

16. In a drive chain of the silent type, a plurality of pitches of links having their adjacent end portions overlapped and transversely alined pitch holes through said overlapped end portions, the pitch holes of the links of alternate pitches each having an angular liner engaging bearing surface at its side nearest the adjacent end of its link and the pitch holes of the links of the remaining pitches being shaped to provide liner clearance to permit chain articulation, and articulating joint parts connecting the overlapped end portions of each pair of adjacent pitches comprising a pin extending through said alined pitch holes, and a liner interposed between the pin and the angular bearing surfaces of the said alternate pitch of the connected pair, said liner having a bearing surface on its periphery for engaging the said angular bearing surfaces, said cooperating liner and angular bearing surfaces having medially located load carrying lands normal to the line of centers of their pitch, said lands each having a depth substantially equal to the diameter of said pin, said liner and angular bearing surfaces also having cooperating wedging portions circumferentially spaced from the opposite ends of said lands for preventing relative movement between the liner and the said alternate pitch.

17. In a drive chain of the silent type, a pair of pitches of links having their adjacent end portions overlapped and transversely alined pitch holes through all of said overlapped end portions, the pitch holes through the said end portions of the links of one of said pitches each having an arcuate bearing surface at its side nearest the adjacent end of its link and the pitch holes through the said end portions of the links of the other of said pitches each having an angular bearing surface at its side nearest the adjacent end of its link, and articulating joint parts connecting said overlapped end portions comprising a pin extending through said alined pitch holes with a surface portion of said pin engaging the said arcuate bearing surfaces, and a liner interposed between the pin and the angular bearing surfaces having a bearing surface on its periphery engaging the said angular bearing surfaces, the liner bearing surface and angular pitch hole bearing surfaces having cooperating medially located load carrying lands and angular cooperating wedging portions circumferentially spaced from the opposite ends of said lands for preventing relative movement between the liner and the pitch of links having said angular pitch hole bearing surfaces, the pitch holes in the overlapped end portions of both pitches also being shaped to provide clearance for the liner and the pin to permit articulation at the joint.

18. In a drive chain of the silent type, a pair of pitches of links having their adjacent end portions overlapped and transversely alined pitch holes through said overlapped end portions, each of said pitch holes having a bearing surface at its side nearest the adjacent end of its link, and articulating joint parts connecting said overlapped end portions comprising a pin, having a flat surface portion on each side and a rounded top surface, extending through said alined pitch holes, and a liner interposed between each side of the pin and the opposed pitch hole bearing surfaces of the links, each liner having a peripheral bearing surface for engaging the opposed pitch hole bearing surfaces of the links of its associated pitch and an interior surface for engaging the flat side surface and the adjacent portion of the rounded top surface of said pin when the pitches are in a straight-line position, the peripheral bearing surface of each liner and the opposed pitch hole bearing surfaces having cooperating medially located load carrying lands and cooperating wedging portions circumferentially spaced from the opposite ends of said lands for preventing relative movement between the liner and its associated pitch, and the pitch holes of the links of each pitch being shaped to provide clearance for the liner associated with the other pitch to permit chain articulation at the joint.

HAROLD S. PIERCE.

References Cited in the file of this patent

UNITED STATES PATENTS

| Number | Name | Date |
| --- | --- | --- |
| 1,405,145 | Morse | Jan. 31, 1922 |
| 1,419,891 | Oakes | June 13, 1922 |

FOREIGN PATENTS

| Number | Country | Date |
| --- | --- | --- |
| 321,329 | Great Britain | Nov. 7, 1929 |